US008803346B2

(12) United States Patent
Pitre et al.

(10) Patent No.: US 8,803,346 B2
(45) Date of Patent: Aug. 12, 2014

(54) SYSTEM AND METHOD FOR GENERATING ELECTRICITY USING GRID OF WIND AND WATER ENERGY CAPTURE DEVICES

(75) Inventors: John Pitre, Honolulu, HI (US); Stuart Huang, Honolulu, HI (US)

(73) Assignee: Natural Power Concepts, Inc., Honolulu, HI (US)

( * ) Notice: Subject to any disclaimer, the term of this patent is extended or adjusted under 35 U.S.C. 154(b) by 113 days.

(21) Appl. No.: 12/659,442

(22) Filed: Mar. 9, 2010

(65) Prior Publication Data

US 2010/0230965 A1 Sep. 16, 2010

Related U.S. Application Data

(60) Provisional application No. 61/202,522, filed on Mar. 9, 2009.

(51) Int. Cl.
*F03B 13/20* (2006.01)

(52) U.S. Cl.
USPC .......................................................... 290/42

(58) Field of Classification Search
CPC .... F03B 13/186; F03D 9/008; F05B 2240/40; F05B 2240/95; F05B 2240/96; Y02E 10/28; Y02E 10/38; Y02E 10/72
USPC .......................................................... 290/42
See application file for complete search history.

(56) References Cited

U.S. PATENT DOCUMENTS

| 832,482 A | 10/1906 | Hutchings |
| 1,184,362 A | 5/1916 | Lindquist |
| 1,259,845 A | 3/1918 | Furness et al. |
| 1,502,511 A | 7/1924 | Marvin |
| 3,546,473 A | 12/1970 | Rich |
| 3,961,863 A * | 6/1976 | Hooper, III .................... 417/334 |
| 3,965,364 A | 6/1976 | Gustafson et al. |
| 4,073,142 A | 2/1978 | Tornabene |

(Continued)

FOREIGN PATENT DOCUMENTS

| JP | 2004176626 A | 6/2004 |
| JP | 2004251139 A | 9/2004 |

(Continued)

OTHER PUBLICATIONS

Musial "Feasibility of Floating Platform Systems for Wind Turbines," 23rd ASME Wind Energy Symposium, Jan. 5-8 2004.

(Continued)

*Primary Examiner* — Tulsidas C Patel
*Assistant Examiner* — S. Mikailoff
(74) *Attorney, Agent, or Firm* — Novak Druce Connolly Bove + Quigg LLP

(57) ABSTRACT

A system for maintaining buoyant, energy-capture devices in general relative position in water in the presence of surface waves allows heeling of the energy capture devices while preventing collision. The system includes a grid of structural members that resists compression while permitting limited relative surface displacement between the first and second energy-capture devices. The structural members may be partially compressible and provide a restoring force, and they may allow heeling. Electricity from wave energy capture devices is combined in a way that smoothes variations inherent in wave action. Electricity from wind energy capture devices is combined with energy from wave energy capture devices for transmission to shore.

8 Claims, 17 Drawing Sheets

(56) References Cited

U.S. PATENT DOCUMENTS

| | | | |
|---|---|---|---|
| 4,098,084 A * | 7/1978 | Cockerell | 60/500 |
| 4,118,932 A * | 10/1978 | Sivill | 60/500 |
| 4,206,601 A | 6/1980 | Eberle | |
| 4,293,274 A | 10/1981 | Gilman | |
| 4,363,213 A | 12/1982 | Paleologos | |
| 4,447,740 A | 5/1984 | Heck | |
| 4,538,849 A * | 9/1985 | Khachaturian et al. | 294/81.1 |
| 4,539,485 A | 9/1985 | Neuenschwander | |
| 4,622,473 A | 11/1986 | Curry | |
| 4,631,921 A | 12/1986 | Linderfelt | |
| 4,661,716 A * | 4/1987 | Chu | 290/53 |
| 4,686,377 A * | 8/1987 | Gargos | 290/53 |
| 4,742,241 A | 5/1988 | Melvin | |
| 4,792,290 A * | 12/1988 | Berg | 417/332 |
| 5,167,786 A | 12/1992 | Eberle | |
| 5,324,988 A | 6/1994 | Newman | |
| 5,708,305 A * | 1/1998 | Wolfe | 290/53 |
| 5,842,838 A | 12/1998 | Berg | |
| 5,889,336 A | 3/1999 | Tateishi | |
| 5,909,060 A * | 6/1999 | Gardner | 290/53 |
| 6,791,205 B2 | 9/2004 | Woodbridge | |
| 6,857,266 B2 | 2/2005 | Dick | |
| 6,864,592 B1 | 3/2005 | Kelly | |
| 7,105,942 B2 * | 9/2006 | Henriksen | 290/55 |
| 7,140,180 B2 | 11/2006 | Gerber et al. | |
| 7,141,888 B2 | 11/2006 | Sabol et al. | |
| 7,168,532 B2 | 1/2007 | Stewart et al. | |
| 7,199,481 B2 | 4/2007 | Hirsch | |
| 7,215,036 B1 * | 5/2007 | Gehring | 290/54 |
| 7,293,960 B2 | 11/2007 | Yamamoto et al. | |
| 7,298,054 B2 | 11/2007 | Hirsch | |
| 7,310,944 B2 | 12/2007 | Sabol et al. | |
| 7,323,790 B2 | 1/2008 | Taylor et al. | |
| 7,352,078 B2 * | 4/2008 | Gehring | 290/54 |
| 7,362,003 B2 | 4/2008 | Stewart et al. | |
| 7,385,301 B2 | 6/2008 | Hirsch | |
| 7,444,811 B2 | 11/2008 | Skotte et al. | |
| 7,629,703 B2 * | 12/2009 | Storbekk | 290/53 |
| 7,632,041 B2 * | 12/2009 | Jean et al. | 405/76 |
| 7,808,120 B2 * | 10/2010 | Smith | 290/42 |
| 7,948,101 B2 * | 5/2011 | Burtch | 290/44 |
| 8,049,356 B2 * | 11/2011 | Chervin et al. | 290/53 |
| 2005/0099010 A1 | 5/2005 | Hirsch | |
| 2005/0206247 A1 | 9/2005 | Stewart et al. | |
| 2005/0218728 A1 | 10/2005 | Stewart et al. | |
| 2005/0230206 A1 | 10/2005 | Stewart et al. | |
| 2005/0235641 A1 | 10/2005 | Sabol et al. | |
| 2005/0237775 A1 | 10/2005 | Sabol et al. | |
| 2006/0208839 A1 | 9/2006 | Taylor et al. | |
| 2006/0261597 A1 * | 11/2006 | Gehring | 290/44 |
| 2007/0009325 A1 | 1/2007 | Oigarden et al. | |
| 2007/0068153 A1 | 3/2007 | Gerber | |
| 2007/0120371 A1 * | 5/2007 | Gehring | 290/54 |
| 2007/0132246 A1 | 6/2007 | Hirsch | |
| 2007/0193265 A1 * | 8/2007 | Skotte et al. | 60/495 |
| 2007/0224895 A1 | 9/2007 | Draper | |
| 2007/0228737 A1 | 10/2007 | Hirsch | |
| 2007/0257490 A1 | 11/2007 | Kornbluh et al. | |
| 2007/0257491 A1 | 11/2007 | Kornbluh et al. | |
| 2008/0016860 A1 | 1/2008 | Kornbluh et al. | |
| 2008/0018115 A1 * | 1/2008 | Orlov | 290/54 |
| 2008/0036213 A1 | 2/2008 | Storbekk | |
| 2008/0284173 A1 | 11/2008 | Stansby et al. | |
| 2009/0162144 A1 * | 6/2009 | Ayre | 405/76 |
| 2010/0050500 A1 * | 3/2010 | Pieraccini | 44/300 |
| 2011/0285136 A1 * | 11/2011 | Desmeules | 290/54 |

FOREIGN PATENT DOCUMENTS

| | | |
|---|---|---|
| JP | 2005351087 A | 12/2005 |
| WO | WO 02073032 A1 * | 9/2002 |
| WO | WO-02073032 A1 | 9/2002 |

OTHER PUBLICATIONS

"Feasibility of Developing Wave Power as a Renewable Energy Resource for Hawaii," Hawaii Dept. of Business, Economic Development, and Tourism, Jan. 2002.

Von Jouanne, "Harvesting the Waves—Researchers are Closing in on How to Best Harness the Power of the Ocean," Mechanical Engineering, 2006.

International Search Report and Written Opinion, International Application No. PCT/US2010/000705, issued Nov. 4, 2010.

* cited by examiner

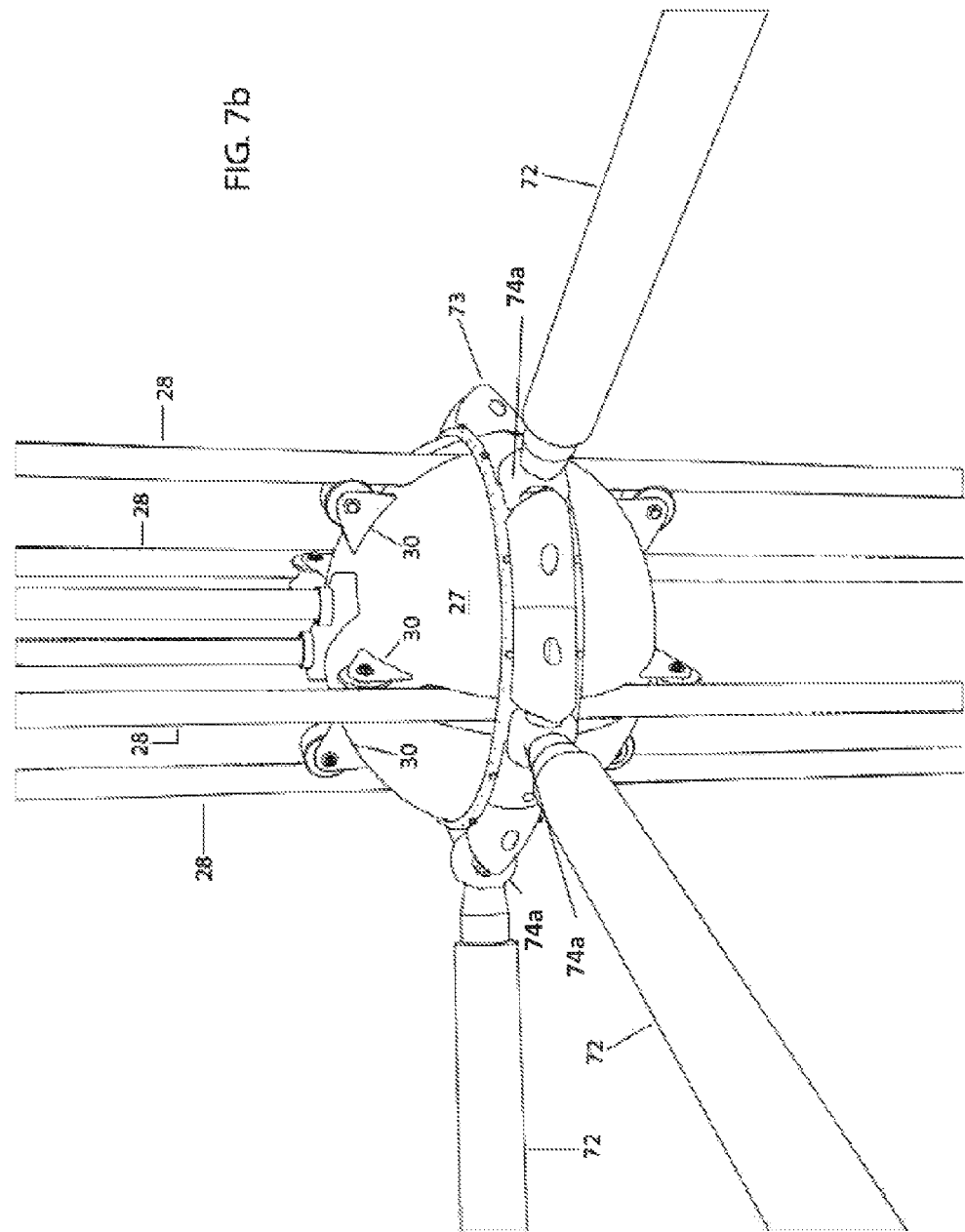

SYSTEM AND METHOD FOR GENERATING ELECTRICITY USING GRID OF WIND AND WATER ENERGY CAPTURE DEVICES

CROSS-REFERENCE TO RELATED APPLICATIONS

This application claims priority to U.S. Provisional Patent Application 61/202,522 titled "System and Method for Generating electricity Using Grid of Wind and Water Energy Capture Devices" filed in the U.S. Patent and Trademark Office on Mar. 9, 2009, the disclosure of which is incorporated herein by reference in its entirety.

This application refers to (i) U.S. Provisional Patent Application 61/202,189 titled "Folding Blade Turbine" filed in the U.S. Patent and Trademark Office on Feb. 4, 2009, (ii) U.S. patent application Ser. No. 12/461,716 titled "Folding Blade Turbine" filed in the U.S. Patent and Trademark Office on Aug. 21, 2009, (iii) U.S. Provisional Patent Application 61/193,395 titled "Column Structure with Protected Turbine" filed in the U.S. Patent and Trademark Office on Nov. 24, 2008, and (iv) U.S. patent application Ser. No. 12/461,714 titled "Column Structure with Protected Turbine" filed in the U.S. Patent and Trademark Office on Aug. 21, 2009, the disclosures of which are incorporated herein by reference in their entireties.

STATEMENT REGARDING FEDERALLY SPONSORED RESEARCH OR DEVELOPMENT

None.

NAMES OF THE PARTIES TO A JOINT RESEARCH AGREEMENT

None.

BACKGROUND

As of March 2009, no wave energy facility was in regular service generating electricity for any U.S. utility company. According to the website of Pelamis Wave Power, Ltd., the multiple Pelamis units making up the Aguçadoura wave farm (off the northern coast of Portugal) constitute the world's first, multi-unit, wave farm and also the first commercial order for wave energy converters. No offshore wind farm is in commercial operation in the U.S. It has been estimated that approximately 600 MW of offshore wind energy capacity has been installed worldwide, mostly in European in waters less than 30 meters deep.

SUMMARY

Integrated wind/wave energy capture systems are disclosed for harvesting energy from both wind and surface water waves. A first embodiment uses a grid of integrated wind/wave energy capture devices held in general relative position by a lattice of structural members. Each integrated wind/wave energy capture device includes both a wind energy capture device and a wave energy capture device. Alternate embodiments use a primary wind energy capture device and a grid of wave energy capture devices. The grid resists compression and expansion to maintain general separation of wave energy capture devices while still allowing some movement. Multiple wind/wave energy capture systems may be deployed in larger wind/wave farms.

Electrical generators on wave energy capture devices generate electricity cyclically and out of phase. An electrical collection and distribution system integrates the cyclical power in a manner that smoothes variations. Electrical power from wave energy capture devices is also integrated with power generated from wind energy capture devices.

BRIEF DESCRIPTION OF THE SEVERAL VIEWS OF THE DRAWING

Reference will be made to the following drawings, which illustrate preferred embodiments of the invention as contemplated by the inventor(s).

FIG. 7b illustrates details of an attachment of structural members 72 to floats 12 in the embodiment of FIG. 7a. A collar 73 wraps around, and is rigidly attached to the float 27. The collar 73 includes stations 74 where structural members 72 mount pivotally to pins (not shown) similar to tie-rods.

DETAILED DESCRIPTION OF THE INVENTION

Figure 1:
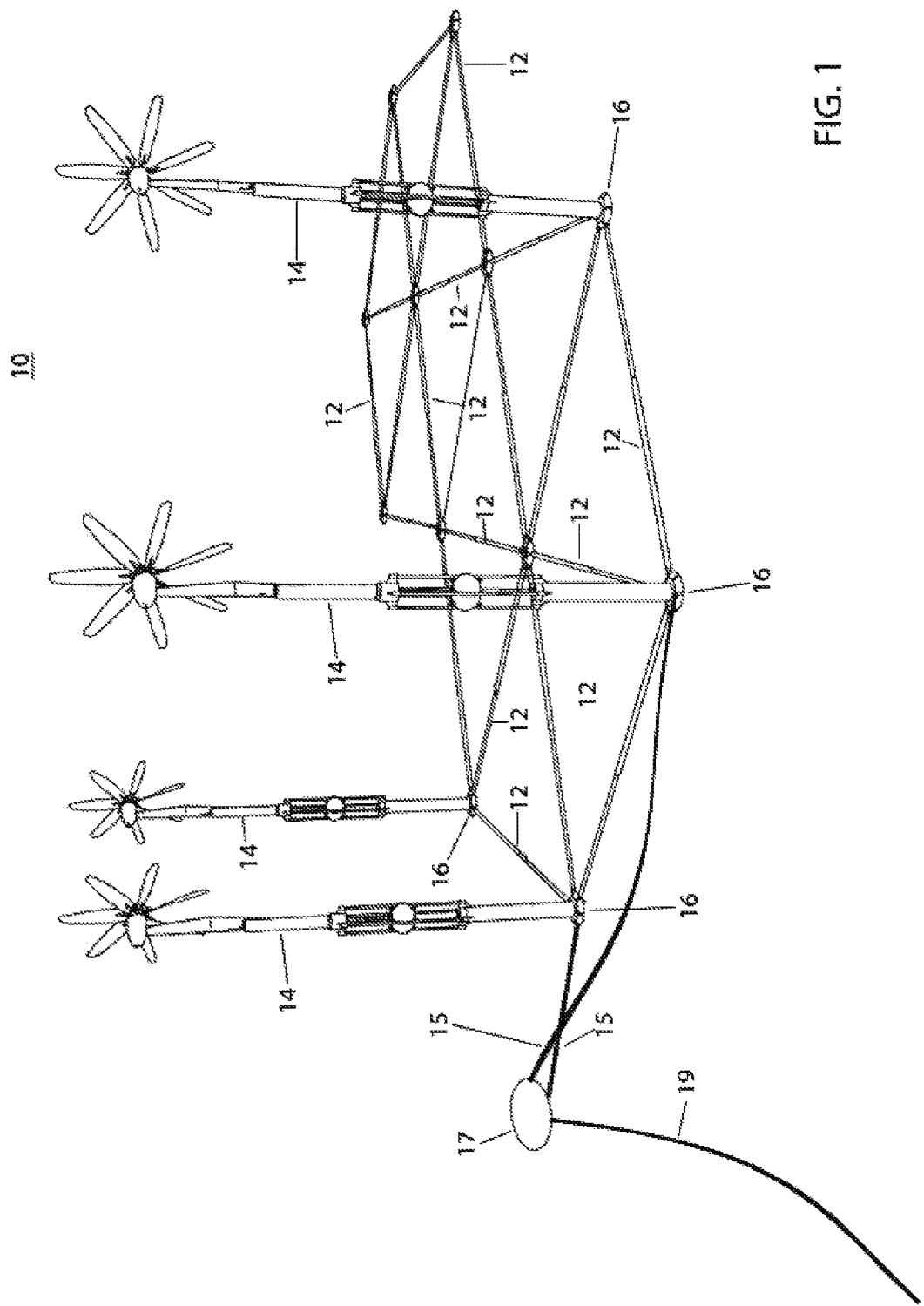
FIG. 1 illustrates a system of wind/wave energy capture devices.

FIG. 1 illustrates a system 10 of wind/wave energy capture devices 14. The system 10 is made up of a grid of structural members 12 which maintain relative positions of wind/wave energy capture devices 14 to one another. A preferred grid of structural members 12 positions wind/wave energy capture devices 14 at vertices of hexagons and center points of hexagons in a generally horizontal plane, i.e., parallel to the water surface. A hexagonal lattice is preferred, but other geometric arrangements may be used. Wind/wave energy capture devices 14 connect mechanically to the grid of structural members 12 through collars 16. For simplicity of illustration, FIG. 1 illustrates a grid of two hexagons (including one common side) and four wind/wave energy capture devices, but the invention is not limited to this specific example. Grids may be larger with 10's or more than 100 wind/wave energy capture devices 14. Wind/wave energy capture devices 14 may be positioned at all or some grid vertices and center points. Details of the wind/wave energy capture devices 14 will be discussed further below.

The grid of structural members 12 preferably couples through mooring lines 15 or other attachments to a master buoy 17, which in turn connects to a permanent, sea-floor anchorage (not shown) through chain 19 or other permanent attachment. Alternately, the grid may be moored directly to a permanent sea-bed anchorage. When using a master buoy 17, the grid may be allowed to weathercock or swing downwind of the anchorage under the influence of a prevailing wind.

Figure 2:
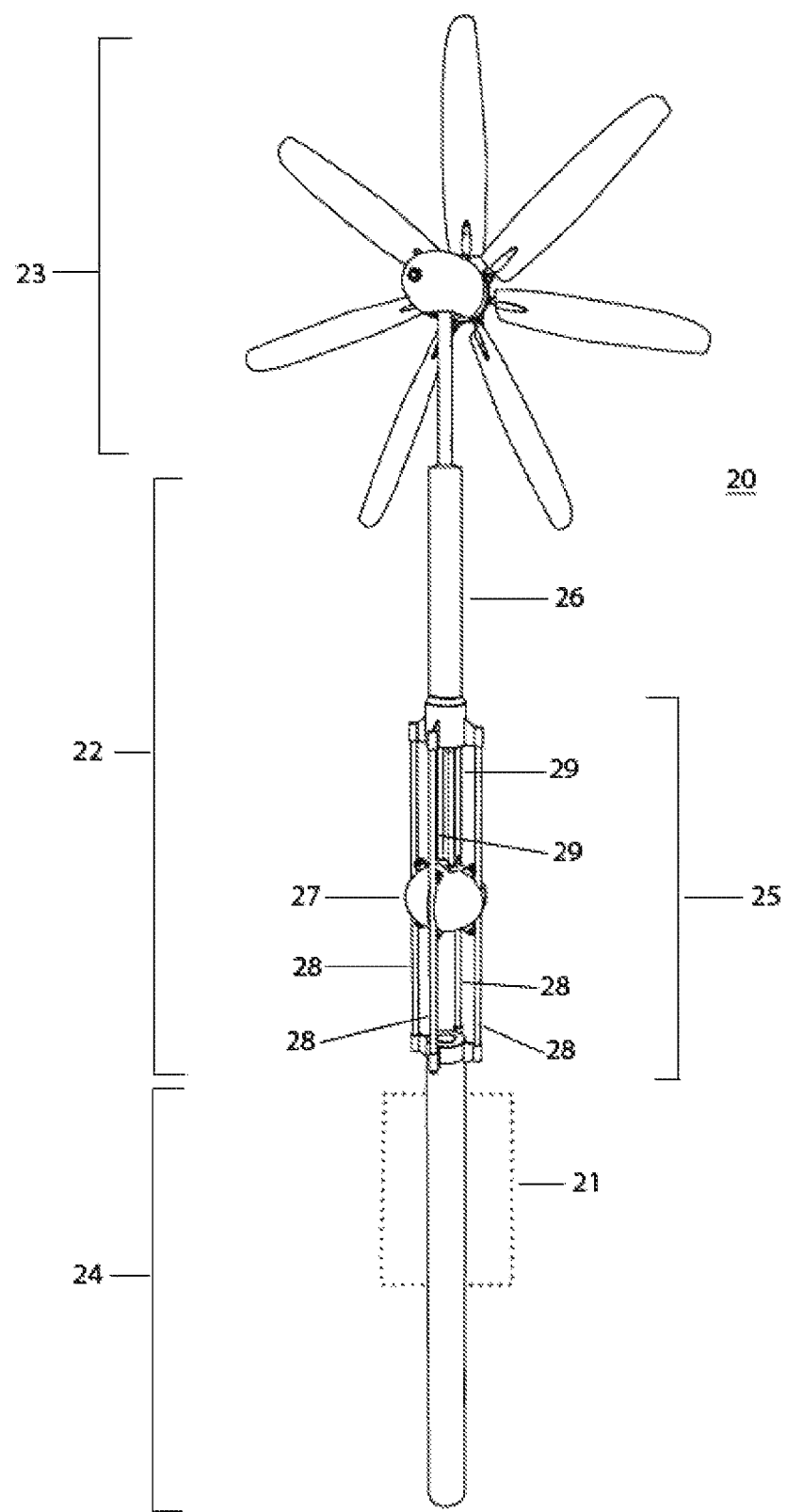
FIG. 2 illustrates a wind/wave energy capture device suitable for use in the system of FIG. 1.

FIG. 2 illustrates a wind/wave energy capture device 20 suitable for use in the system 10 of FIG. 1. The wind/wave energy capture device 20 includes a buoyant mast 24, a wind energy capture device 23, and a wave energy capture device 22. The wind/wave energy capture device 20 may include additional components, such as compartments for electrical equipment, access hatches, electrical lighting, etc., which are not shown for clarity of illustration.

The preferred mast 24 is a structure of generally cylindrical shape with a displacement sufficient to support buoyantly:
 (i) its own weight;
 (ii) the weight of the wind energy capture device 23;
 (iii) the weight of the wave energy capture device 22;
 (iv) a portion of the weights of connecting-grid structural members (e.g., FIG. 1, item 12); and
 (v) the weights of additional equipment and other attachments, such as electrical cabling, lighting, communication and control equipment, etc.

The mass distribution within the mast 24 places more mass at a bottom end (remote from the wave energy capture device 25) to position the center of mass of the integrated wind/wave energy capture device 20 below the center of buoyancy of the mast 24. Such a mass distribution may be obtained by adding ballast to the base of the mast 24. In this way, the integrated wind/wave energy capture device 20 naturally aligns itself vertically in water with the mast 24 at least partially submerged, a cage portion 25 of the wave energy capture device 22 centered at the water line, and the wind energy capture device 23 elevated in the air. Ballast may be stone, lead, water, metal chain, or other suitably dense material. Buoyancy distribution may be modified by altering the displacement of the mast 24 at different points along its length. For example, an air-filled collar 21 may be provided at or near the top of the mast 24 to move the center of buoyancy closer to the water surface.

The wave energy capture device 22 includes a float 27 free to move up and down along four guide rails 28 under the rising and falling action of surface waves. The guide rails 28 figuratively form a rectangular cage 25. Two gear racks 29 are mounted to the top of, and rise and fall with, the float 27. The racks 29 extend upward from the float 27 along the axis of the wind/wave energy capture device 20 into a housing 26 that contains an electrical power take-off (not shown). The racks are long enough so that, throughout the stroke of the float 27, the gear racks 29 maintain continuous engagement with the power take-off.

Figure 3:
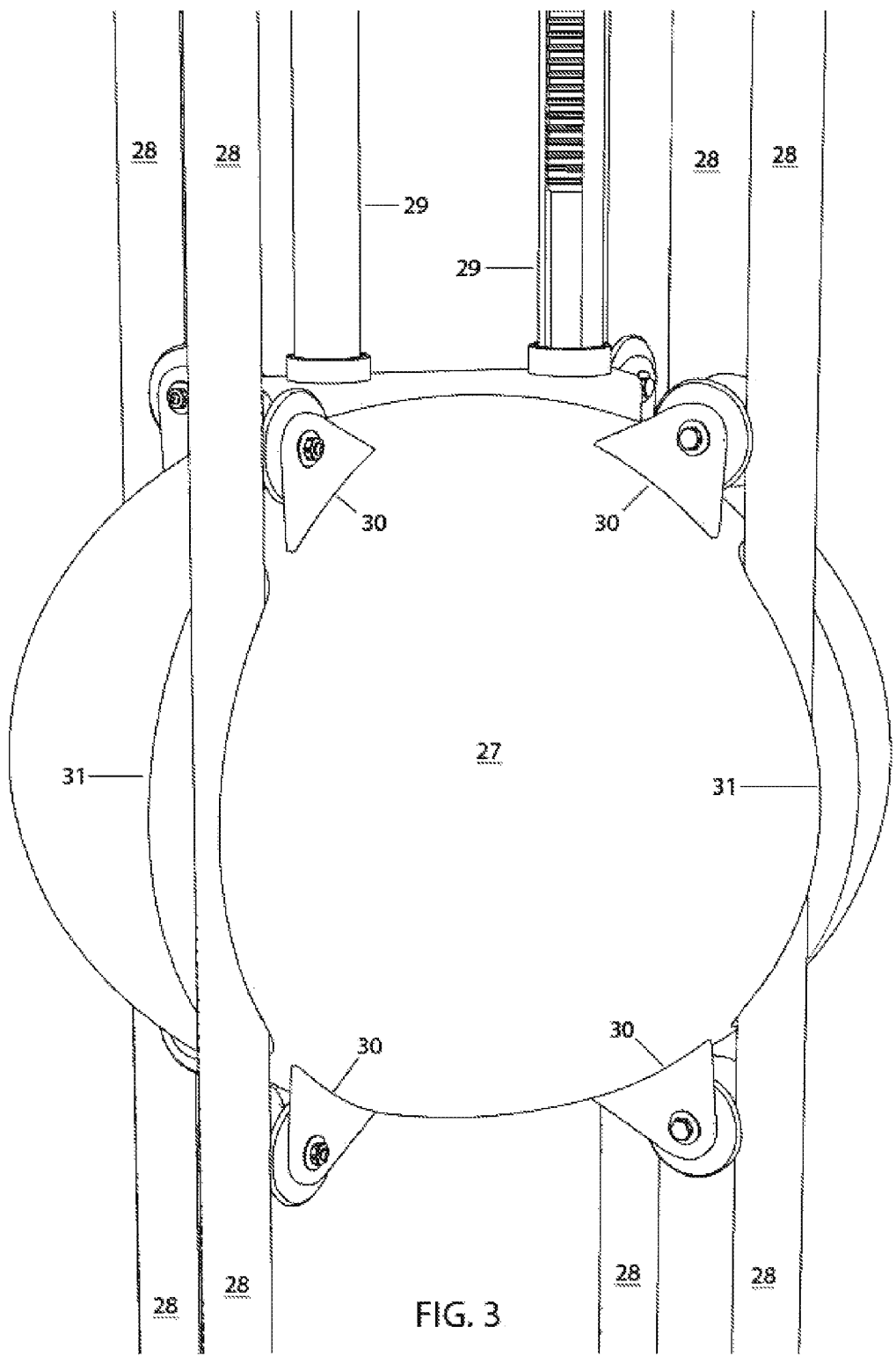
FIG. 3 illustrates details of the float of an exemplary wave energy capture device.

FIG. 3 illustrates details of the float 27 of the wave energy capture device 22 of FIG. 2. The guide rails have a separation distance that is less than the diameter of the float 27 and penetrate the float through channels 31. The float 27 rides the guide rails 28 on four pairs of idler wheels 30: one pair for each of the guide rails 28.

Figure 4:
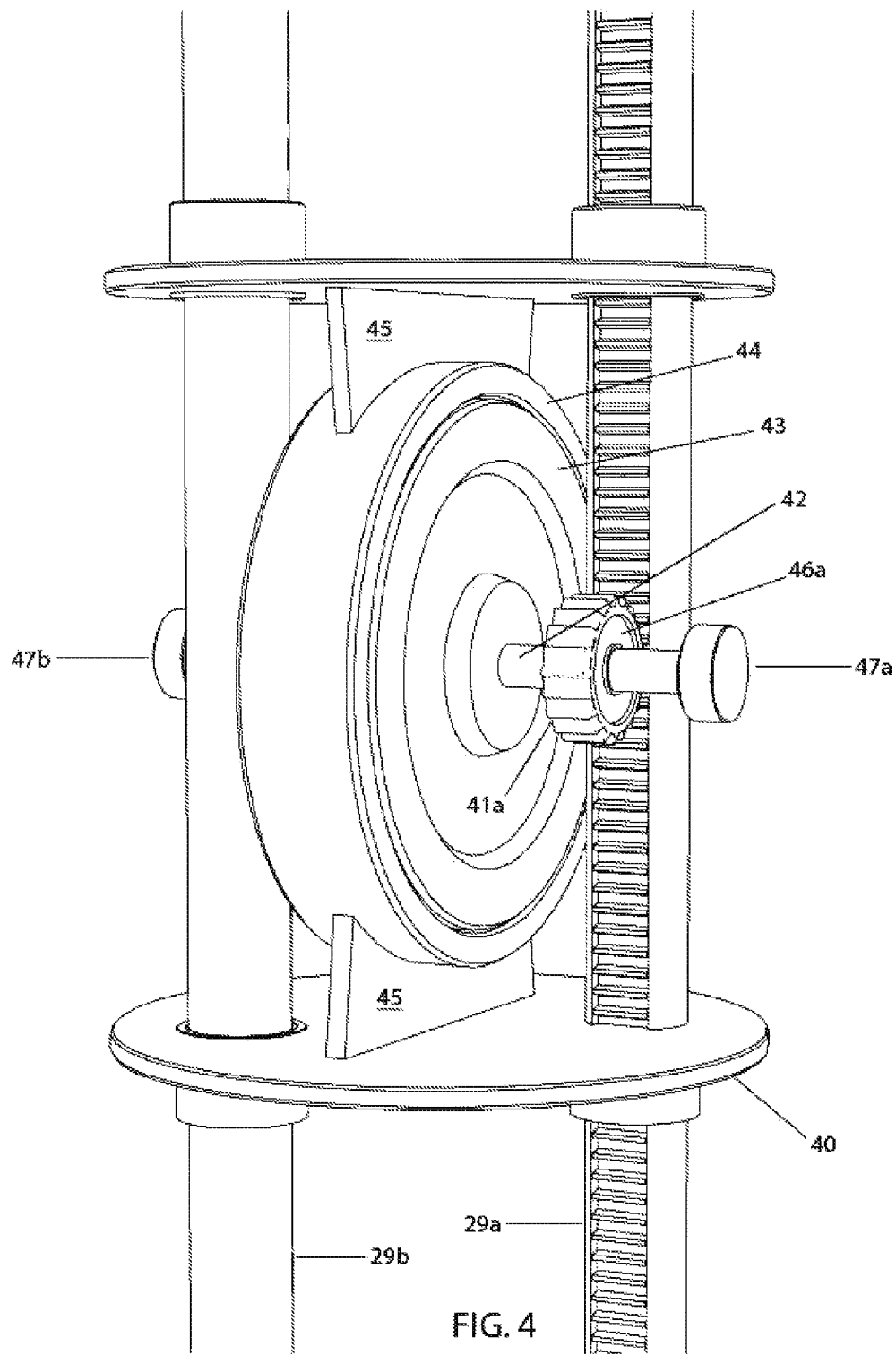
FIG. 4 illustrates details of a power take-off for a wave energy capture device.
Figure 5:
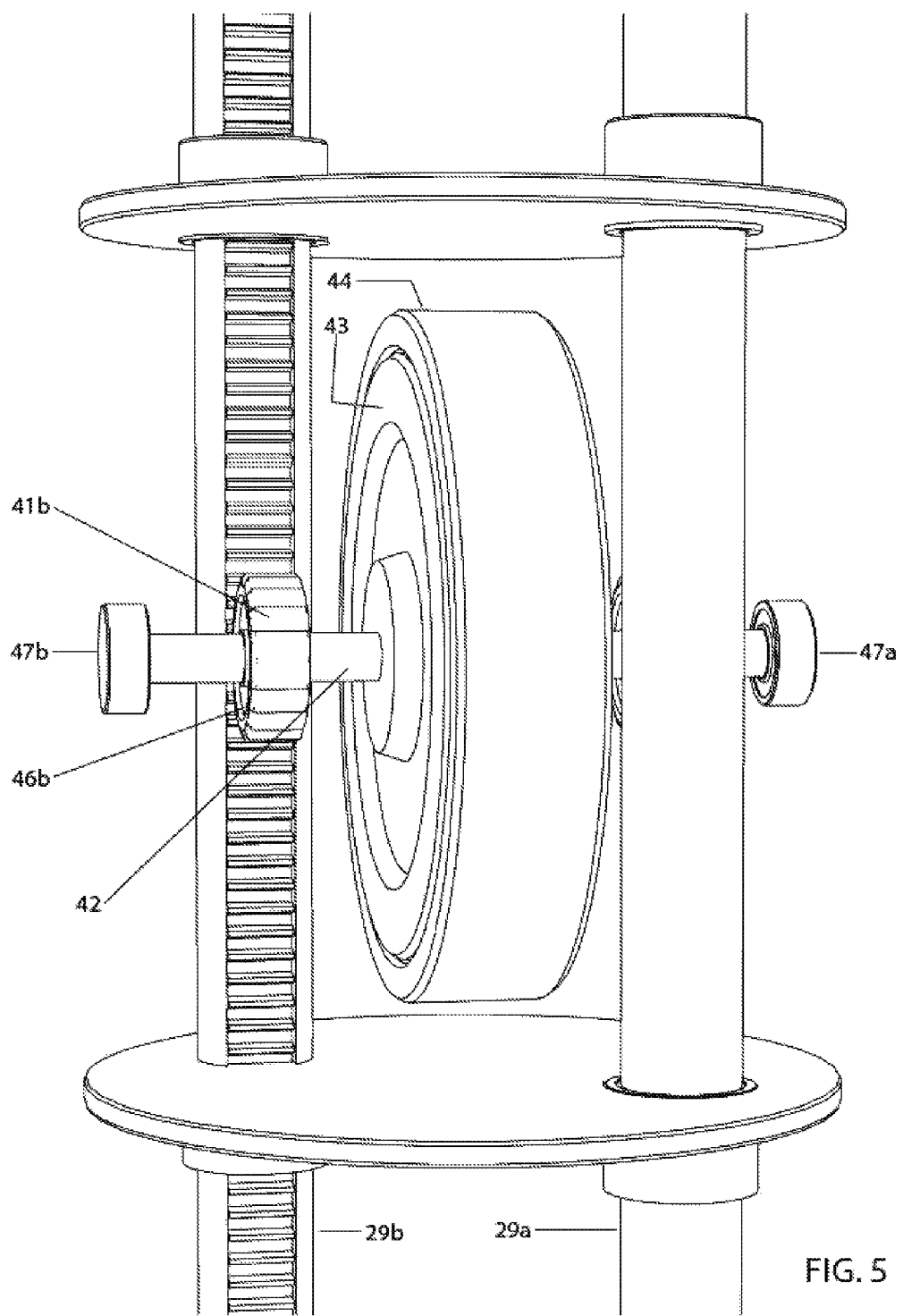
FIG. 5 is an alternate, cut-away perspective view of the power take-off in the housing 26 of the wave energy capture device of FIG. 4.

FIGS. 4 and 5 are left and right cut-away perspective views of a power take-off in the housing 26 of the wave energy capture device 22 of FIG. 2. Racks 29*a*, 29*b* pass through a floor plate 40 of the housing 26 where they engage pinion gears 41*a*, 41*b*. Pinion gears 41*a*, 41*b* connect through sprag clutches 46*a*, 46*b* to the drive shaft 42 of the rotor 43 of an electric generator. Drive shaft bearings 47*a*, 47*b* mount to the housing 26. Sprag clutches 46*a*, 46*b* transmit rotational power in only one direction. The sprag clutches 46*a*, 46*b* are arranged in complimentary fashion so that one (e.g., sprag clutch 46*a*) engages during the rising stroke of the float 27, and the other (e.g., sprag clutch 46*b*, FIG. 5) engages during the falling stroke. While the float 27 moves upward during the rising phase of its stroke, the first sprag clutch engages and spins the rotor 43. While the float 27 moves downward during the falling phase of its stroke, the first sprag clutch disengages and the second sprag clutch engages. In this way, the float 27 transmits power to the rotor 43 during both the rising and falling phases of a stroke, and the rotor 43 rotates in the same direction throughout both rising and falling phases. In the embodiment illustrated in FIGS. 4 and 5, the stator 44 of the electric generator mounts fixedly to the housing 40 through brackets 45. The housing 40 in turn mounts fixedly to the mast 24. The electrical generator components should be sealed against salt and moisture carried into the housing on gear racks 29*a* 29*b* or otherwise penetrating the housing.

FIG. 5 is an alternate perspective view of the power take-off in the housing 26 of the wave energy capture device of FIG. 4. This figure illustrates gears of the second rack 29*b*, second pinion gear 41*b*, and second sprag clutch 46*b* that were not fully visible in FIG. 4.

The differential motion of the float relative to the housing 26 translates into a differential rotation of the rotor 43 and stator 44 of the electric generator. As can be seen in FIG. 1, the mast 24 extends relatively deeply below the water surface and rises and falls relatively little under the action of ordinary waves (i.e., statistically common wave heights and wave periods for encountered waves for an installation site). The mast 24 provides a reference platform for the wind energy capture device 23 and wave energy capture device 22. As can be seen in FIG. 2, guide rails 28, housing 26, bearings, 47*a*, 47*b*, pinion gears 41*a*, 41*b* and stator 44 mount directly or indirectly to the mast 24 and form part of the reference platform. The float 27 and toothed drive racks 29*a*, 29*b* rise and fall relative to the pinion gears 41*a*, 41*b* of the reference platform and turn the rotor 43 of the electric generator relative to the stator 44.

Figure 13:
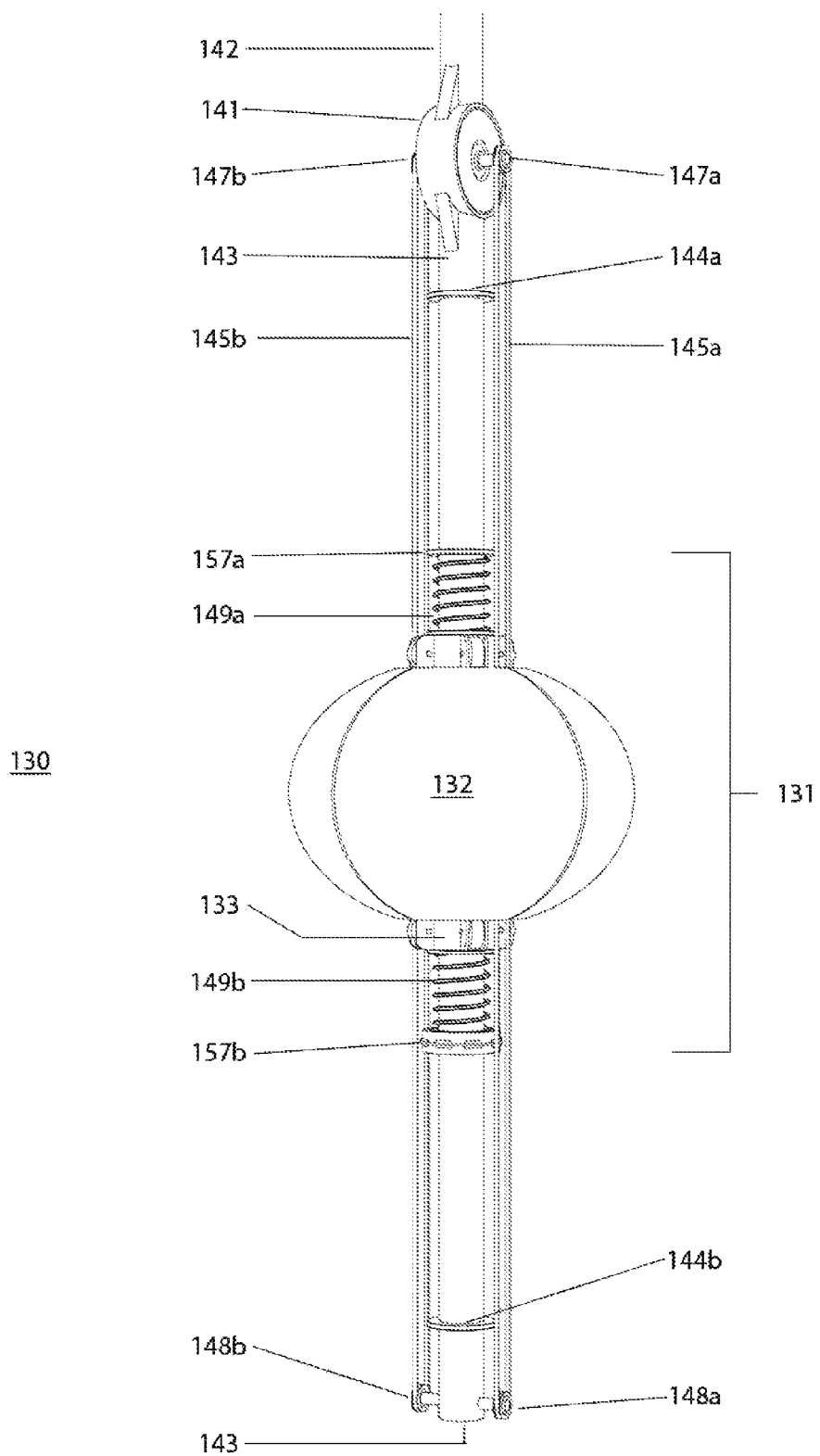
FIG. 13 illustrates an alternative wave energy capture device suitable for use in a wind/wave energy capture device of FIG. 2.

FIG. 13 illustrates an alternative wave energy capture device 130 suitable for use in a wind/wave energy capture device as shown in FIG. 2. The wave energy capture device 130 of FIG. 13 would generally replace the wave energy capture device 22 of FIG. 2. Preferably, the top of the housing of a generator assembly 141 connects (directly or indirectly) to the base a wind energy capture device, such as the wind energy capture device 23 of FIG. 2. The bottom of the housing of the generator assembly 141 preferably connects (directly or indirectly) to a shaft 143 which may be integral to, or connect to, a reference structure, such as the buoyant mast 24 of FIG. 2. While the wave energy capture device 130 may be used as part of an integrated wind/wave energy capture device as part of a system of multiple wind/wave energy capture devices, the wave energy capture device 130 may be used without an attached wind energy capture device, and it may be used alone without other wave energy capture devices.

In the wave energy capture device 130 of FIG. 13, a buoyant float assembly 131 having a float 132 and a carriage 133 rides up and down on the shaft 143 under the action of waves. Float assembly 131 transmits power to the generator assembly 141 through one or more chains or cables. More specifically, a first chain or cable 145a is fastened at a first end to the float assembly 131. The first chain or cable 145a passes over a sprag clutch 147a of the generator assembly 141, traverses past the float assembly 131, passes over an idler sprocket or pulley 148a mounted to the shaft 143 below the float assembly 131, and returns to and fastens again at the second end to the float assembly 131. A second chain or cable 145b similarly is fastened at a first end to the float assembly 131, passes over a sprag clutch 147b of the generator assembly 141, passes over an idler sprocket or pulley 148b mounted to the shaft 143 below the float assembly 131, and fastens again at the second end to the float assembly 131.

The theory of operation of the wave energy capture device 130 is similar to that of the sprag clutches 46a, 46b, racks 29a, 29b and pinion gears 41a, 41b of FIG. 4. During the rising phase of a water wave, the float assembly 131 rises buoyantly, which causes the chains or cables 145a, 145b to circulate in a first direction around the sprag clutches 147a, 147b of the generator assembly 141 and around idler sprockets or pulleys 148a, 148b. During the falling phase of a water wave, the float assembly 131 falls under the action of gravity, which causes the chains or cables 145a, 145b to circulate in a second direction opposite the first direction. Sprague clutches 147a, 147b of the generator assembly 141 are positioned in complementary arrangements so that one of them transmits power to the generator during the rising wave phase while the other transmits power during the falling wave phase. In this way, the generator is always powered to rotate in the same direction without reversing. The generator may be powered by a single chain or cable and a single sprag clutch, in which case it would be preferred to power the generator on the rising phase of the water wave.

The wave energy capture device 130 preferably include impact springs 149a, 149b, and stop rings 144a, 144b positioned to prevent excess travel of the float assembly 131, such as to prevent the float assembly 131 from hitting the generator assembly 141 or idler sprockets or pulleys 148a, 148b during extreme wave displacements. A first stop ring 144a mounts circumferentially around the shaft 143 between the float assembly 131 and the generator assembly 141. A second stop ring 144b mounts circumferentially around the shaft 143 between the float assembly 131 and the idler sprockets or pulleys 148a, 148b. A first impact spring 149a forms the top of the float assembly 131, while the second impact spring 149b forms the bottom of the float assembly 131. The impact springs 149a, 149b are positioned to ride up and down with the float assembly 131 and to absorb impact with the stop rings 144a, 144b upon reaching a maximum upper or lower displacement.

Figure 14:
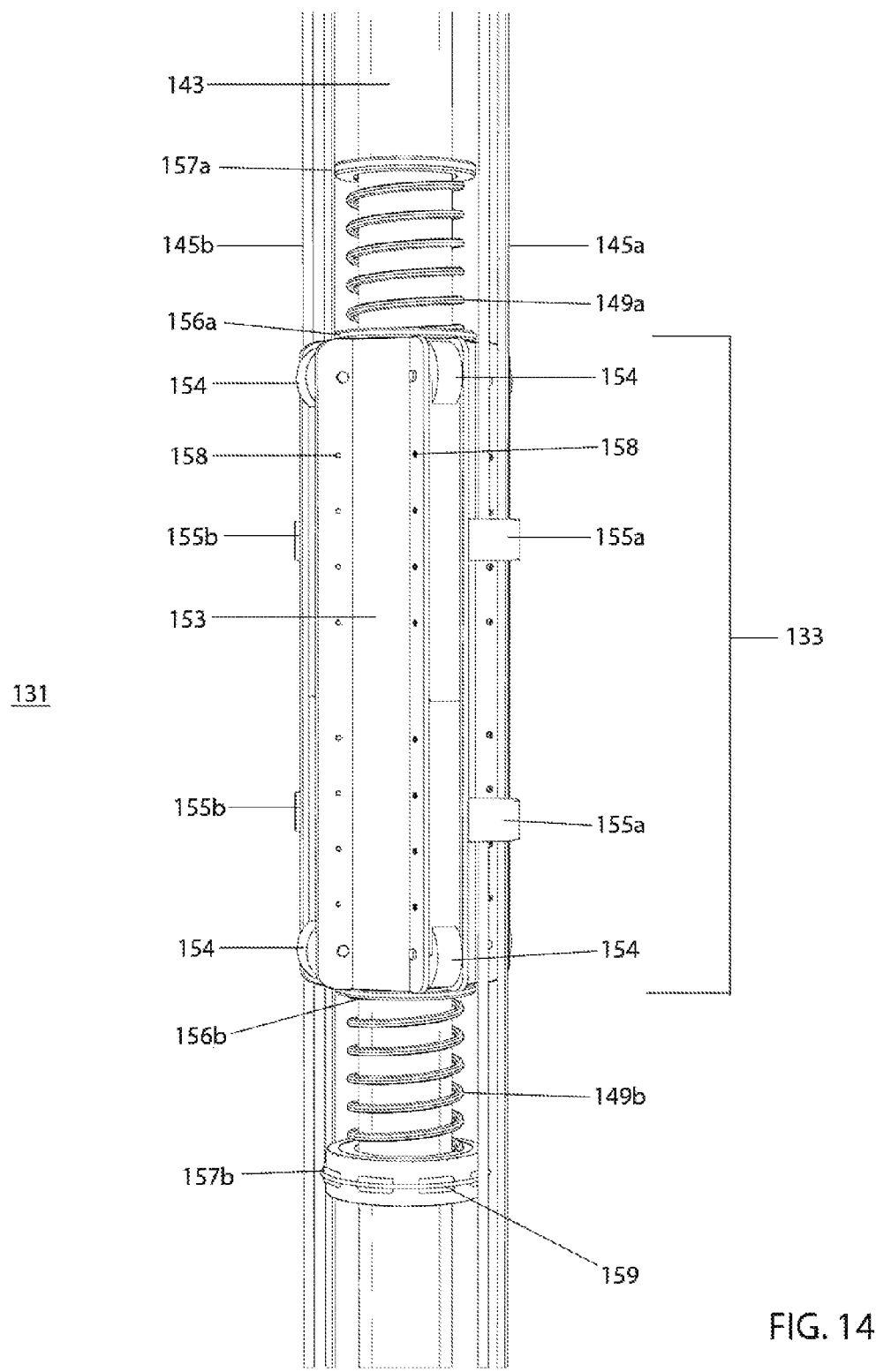
FIG. 14 illustrates details of the float assembly of the wave energy capture device of FIG. 13.

FIG. 14 illustrates details of the float assembly 131 of the wave energy capture device 130 of FIG. 13. The view of FIG. 14 omits the float 132 and other elements to better illustrate certain details, but it should be understood that float 132 attaches to the float assembly 131.

Figure 15:
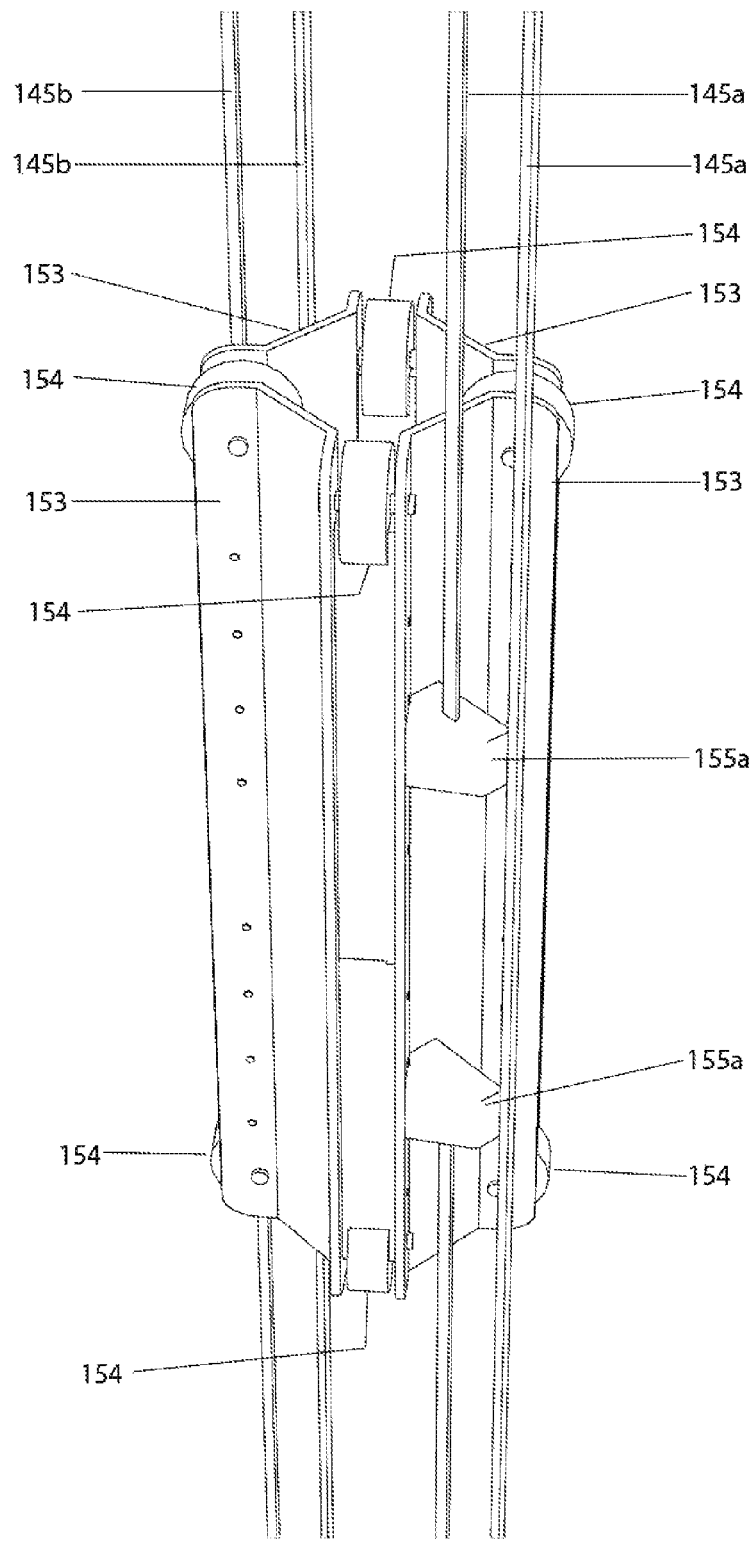
FIG. 15 illustrates details of the carriage of FIG. 14.

The carriage 133 includes four brackets of which a first bracket 153 is most visible in FIG. 14. (Other brackets 153 are shown in FIG. 15.) Each bracket 153 connects through a pair of rollers 154 to two adjacent brackets (shown in FIG. 15). Rollers 154 are positioned to roll up and down along the shaft 143 with low friction. The shaft 143 preferably has an octagonal cross section so that each pair of rollers 154 rides along a flat surface. A first pair of anchors 155a connects to a first bracket 153, while a second pair of anchors 155b connects to a second bracket (not shown). These anchors 155a, 155b form secure attachments for the chains or cables 145a, 145b.

FIG. 14 also shows impact springs 149a, 149b mounted to the brackets 153 through carriage endplates 156a, 156b. Each spring 149a, 149b connects at a first end to a carriage endplate 156a, 156b, and at a second end to a free endplate 157a, 157b. One or both free endplates 157a, 157b may optionally include brushes 159 which move in sliding contact with the shaft 143 to deter and/or remove algae and other fouling which might interfere with movement of the carriage 133.

The float 132 may for example comprise four, generally-hollow, wedge-shaped segments with each segment attaching to one of the four brackets 153 through mounting holes 158 or other means. Each segment may include a sealable porthole on the circumference to gain access through the segment interior to fastening points for assembly and maintenance.

FIG. 15 illustrates details of the carriage 133 of FIG. 13. The view of FIG. 15 omits the shaft 143, impact springs 149a, 149b, and other elements to better illustrate details of brackets 153, rollers 154, anchors 155a, 155b, and chains or cables 145a, 145b. In this view it can better be seen that a chain or cable 145a attaches at a first end to an upper anchor 155a of the carriage 133. The chain or cable 145a passes up and outside the view of the figure to an upper component of the generator assembly, such as the sprag clutch (FIG. 13, item 147a), then returns from above into the view. The same chain or cable 145a pass down and outside the view of the figure to an idler sprocket or pulley (FIG. 13, item 148a), then returns from below back into the view to attach to a lower anchor 155a. Other arrangements for anchoring chains or pulleys may be used.

In this view, a preferred arrangement of rollers 154 also can be seen. The brackets 153 and rollers 154 form eight sides of an octagon which complements the octagonal cross section of the shaft (FIG. 14, item 43). The rollers 154 ride along four sides of the octagon, while the brackets 153 ride outside the other four sides, preferably without making contact.

While FIGS. 4-5, and 13-15 show a wave energy capture device that uses a rotational generator and sprag clutches, other power take off arrangements may be used. For example, mechanical power from the wind energy capture device also may be transmitted to the housing through a drive shaft and coupled to spin the stator 44 in an opposite direction from the rotor 43. Another alternative is a linear generator, which generates electricity from linear motion rather than rotational motion. Contra-rotating generators and linear generators are known in the art of electrical generators.

The wind energy capture device 23 illustrated in FIG. 2 may be: (a) a horizontal axis wind turbine, such as described in co-pending U.S. Provisional Patent Application 61/202, 189 titled "Folding Blade Turbine" and filed in the U.S. Patent and Trademark Office on Feb. 4, 2009, (b) a vertical axis wind turbine arrangement, such as described in co-pending U.S. Provisional Patent Application 61/193,395 titled "Column Structure with Protected Turbine" and filed in the U.S. Patent and Trademark Office on Nov. 24, 2008, and/or (c) another wind turbine. The wind turbines in FIG. 1 are shown as the same design, although the invention is not so limited and different design could be used in the same farm deployment.

The grid of structural members 12 allows limited lateral motion of wind/wave energy capture devices 14 while maintaining general relative spacing. Wind applies a thrust load tending to cause the wind/wave energy capture device to heel (i.e., lean at an angle relative to vertical) and to drift if unrestrained. Waves apply forces tending to move the float 27 in circular motions in a plane perpendicular to the water surface. Waves also apply forces tending to move the mast in circular motions in a plane perpendicular to the water surface, though the effect is substantially smaller because the mast extends deeply below the water surface. Waves may also apply thrust forces parallel to the water surface. Collars 16 (FIG. 1) attach wind/wave energy capture devices 14 to structural member 12 in a way that allows each wind/wave energy capture devices 14 to heel under the action of wind and wave forces without translating so far as to collide with other structures. When a wind turbine is used that has its blades downstream of its nacelle, wind may also apply a torque to wind energy capture device 22 about its central axis. Collars 16 may also allow each wind/wave energy capture device to rotate in place in response to wind torque, which is sometimes referred to as "yaw" or "weather cocking," if the wind energy capture device does not provide its own yaw capability.

FIG. 1 illustrates the grid of structural members 12 coupled to collars 16 at bases of wind/wave energy capture devices 14. The grid of structural members 12 may alternately connect to wind/wave energy capture devices 14 at other points. Especially desirable connection points are: (1) the natural centers of rotation of wind/wave energy capture devices, which reduces stress on structural members 12 from heeling and may allow structural members 12 to be fixed in length, (2) a depth of less then about 100 feet, which allows installation, maintenance, and inspection by SCUBA divers without special diving gear, and (3) at the water surface, which allows installation, maintenance, and inspection from surface ship.

Figure 6:
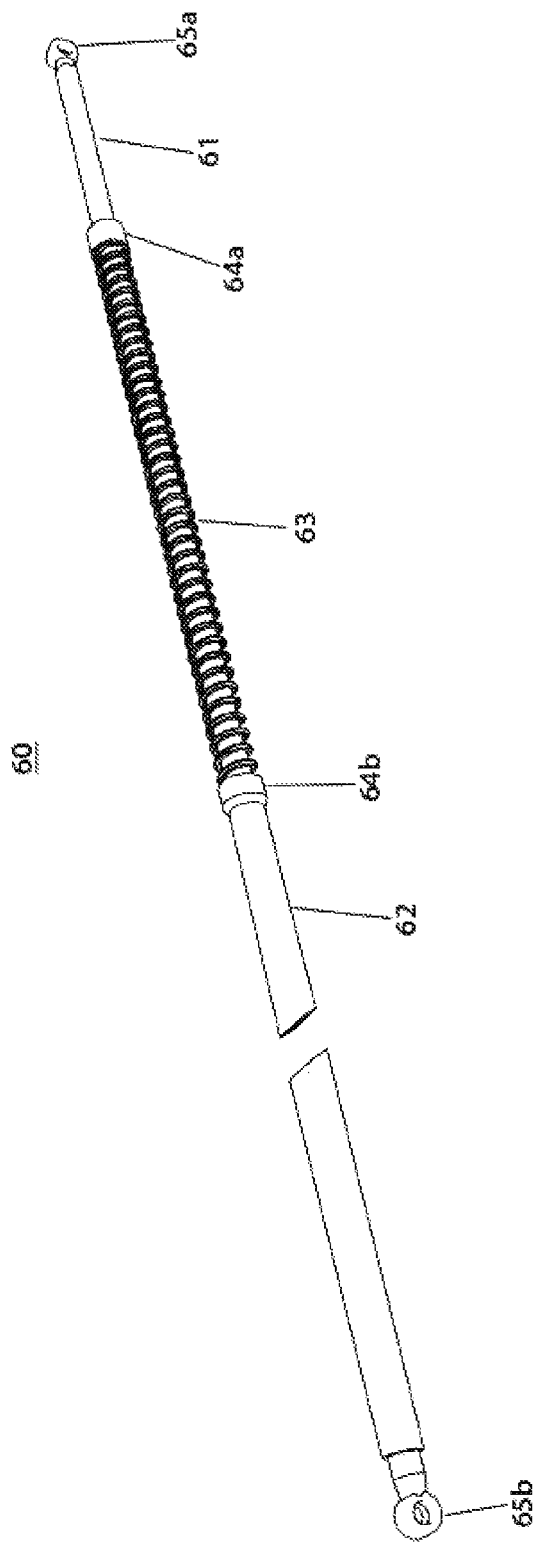
FIG. 6 illustrates details of structural members for a grid of integrated wind/wave energy capture devices.

FIG. 6 illustrates details of an exemplary structural member 60 for a grid of integrated wind/wave energy capture devices according to various embodiments of the invention. The structural member 60 includes a piston 61 extending partly within and partly without a mating cylinder 62. A helical spring 63 mounts around an exterior portion of the piston held in place by a first collar 64a fixed to the piston 61 and a second collar 64b or other position holding stop fixed to the cylinder 62. Distal ends 65a, 65b of the piston 61 and cylinder 62 provide pivotal tie points for connection to wind/wave energy capture devices.

Wave action tends to move floats of wave energy capture devices in vertically-oriented circular motions. The piston 61 may slide deeper into, or recede further out of, the cylinder 62 to accommodate a limited amount of such circular motion. The spring 63 provides a restoring force to prevent excessive motion, such as would allow collision of wave energy capture devices. Structural members may alternately be incompressible and allow only rotation. By opposing compression while allowing some limited surface motion, the structural members 60 maintain desired average separation distance and reduce peak structural stress, which in turn reduces cost and increases survivability and durability of the entire system.

Figure 7A:
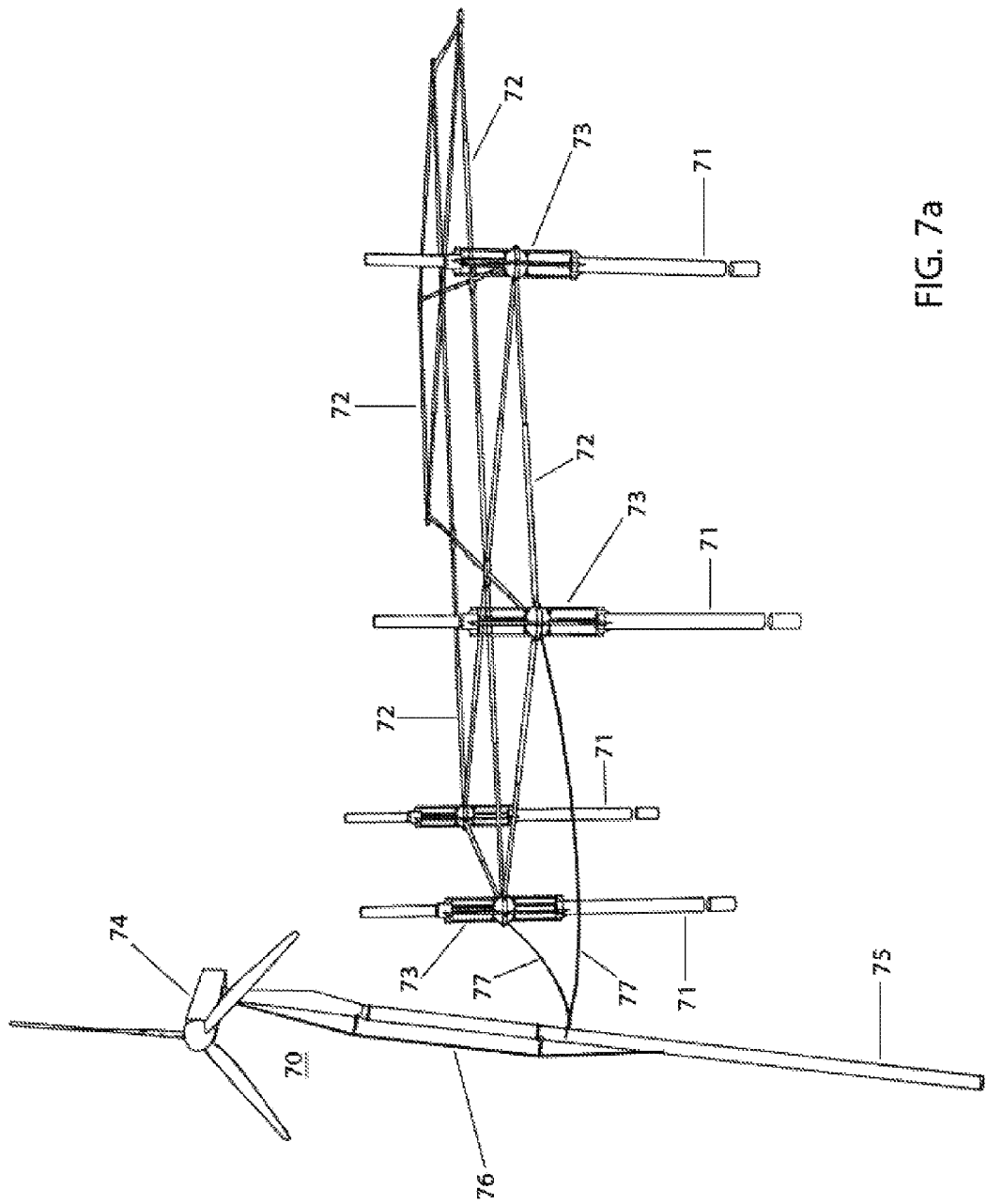
FIG. 7a illustrates an alternative embodiment of a grid of integrated wind/wave energy capture devices having a single wind energy capture device and sub-surface interconnection of wave energy capture devices.

FIG. 7a illustrates an alternative embodiment of a system of wind/wave energy capture devices. This embodiment includes a primary wind energy capture device 70 and a grid of wave energy capture devices 73 interconnected by structural members 72. The structural members 72 may position wave energy capture devices 73 at the vertices of hexagonal patterns with an additional wave energy capture device at center points of hexagons. For simplicity of illustration, wave energy capture devices 73 are shown at only some of the vertices, with the understanding that: (i) additional wave energy capture devices may be positioned at any vertex and/or hexagon center, and (ii) the grid may be extended with additional structural members 72 and wave energy capture devices 73. Masts 71 of wave energy capture devices 73 are shown as separated sections to indicate that the drawing is not to scale and that masts 71 extend farther than the illustrated dimensions, but it should be understood that masts 71 are contiguous structures.

The wind energy capture device 70 includes a wind turbine 74 mounted atop a mast 75. The mast 75 may be fixed to a sea bed or it may be buoyant and moored to a sea-bed anchorage, depending on installation location. The mast 75 may include one or more stays 76 connected at both ends to the mast 75 to provide additional stiffness against bending stresses that result from thrust load on the wind turbine 74.

The grid of wave energy capture devices 73 preferably connects at two points to the wind energy capture device 70 through mooring lines 77 or other attachments. Alternately, the grid of wave energy capture devices 73 may be moored separately to a common sea-bed anchorage, or the grid of wave energy capture devices 73 may be moored to a separate anchorage.

The wave energy capture devices 73 of the embodiment of FIG. 7 are similar to the wave energy capture devices 22 of FIG. 2 in that they include a float free to move up and down along rails under the rising and falling action of surface waves. They also include racks extending upward into a housing where they engage with an electric generator (not shown) through sprag clutches (not shown) or other power take-off device, such as a contra-rotating generator or linear generator. For simplicity of illustration, FIG. 7 does not illustrate the water line; however, it should be understood that the buoyancy of wave energy capture devices 73 is selected so that they sit with the rails and floats at the water line.

FIG. 7b illustrates details of an attachment of structural members 72 to floats 12 in the embodiment of FIG. 7a. A unitary or multi-piece collar 73 attaches around the outside of the float 27. The collar 73 connects to structural members 72 at stations 74a with pins that allow some movement of the structural members 72 relative to the collar.

Figure 8:
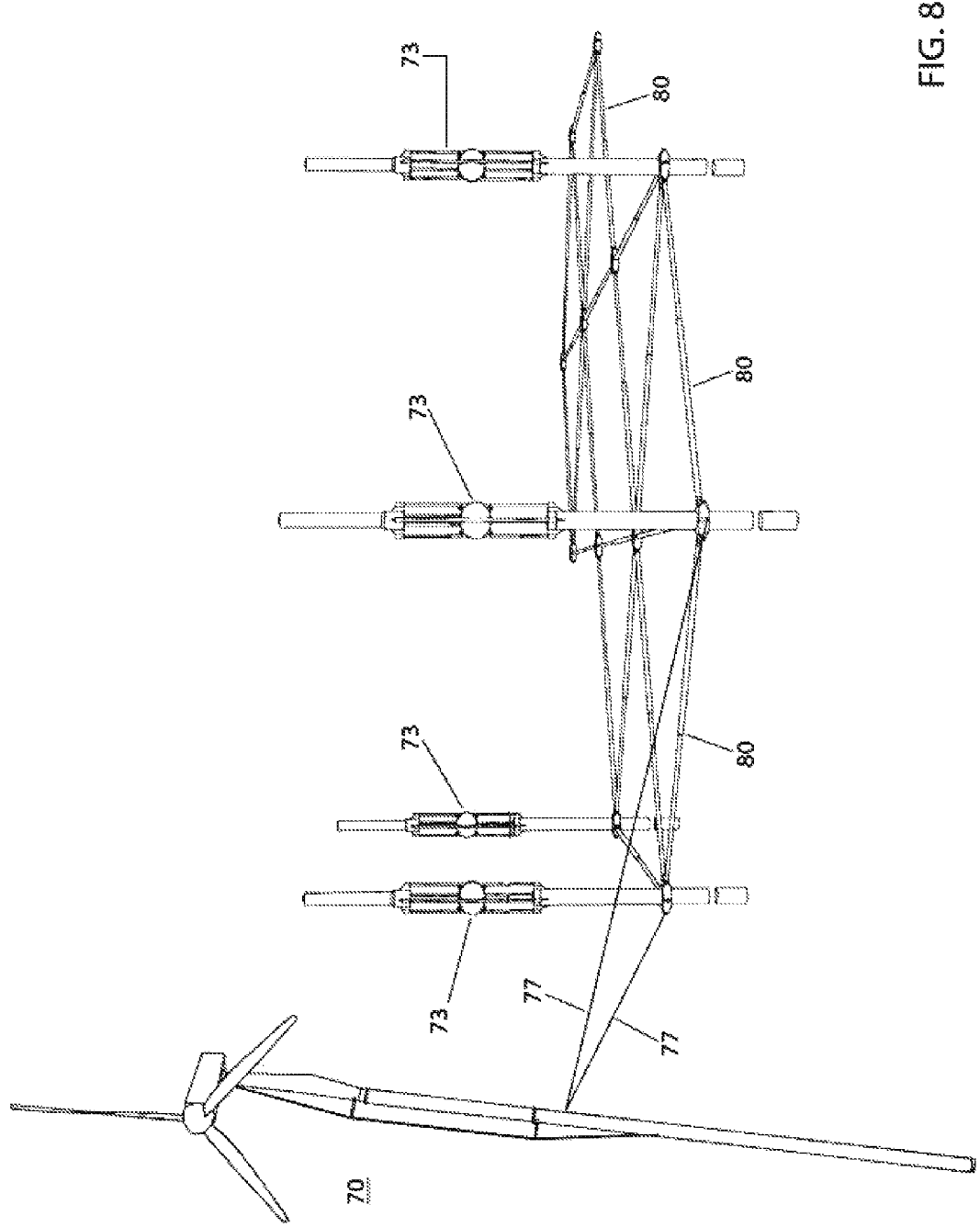
FIG. 8 illustrates an alternative embodiment of a grid of system for capture wind and wave using a sub-surface lattice of structural members.

FIG. 8 illustrates an alternative embodiment of a grid of system for capture wind and wave using a sub-surface lattice of structural members. The embodiment of FIG. 8 includes a primary wind energy capture device 70 and wind/wave energy capture devices 73 of the kind shown in FIGS. 7a and 7b, though other wave energy capture devices may be used. Structural members 80 hold wave energy capture devices 73 generally at the vertices and centers of hexagons. The lattice of structural member 80 attach through mooring lines 77 or other attachments to a primary wind energy capture device 70. Structural members 80 are at least partially compressive and allow limited relative movement of wave energy capture devices 73.

Structural members 80 of this embodiment attach to masts below the water surface, preferably at depths of up to about 100 feet, or the depth where divers may perform installation and maintenance tasks using SCUBA gear. Alternately, structural members 80 may attach at depths corresponding to the depth of the natural rotational center of wave energy capture devices 73, which may be in the lower half of the masts of the wave energy capture devices 73. FIG. 8 has been simplified for clarity of illustration, with an understanding that (i) not all wave energy capture devices 73 and structural members 80b are shown, (ii) wave energy capture devices 73 sit with their floats at the water line, and (iii) masts are contiguous structures that extend farther than the illustrated dimensions.

Figure 9:
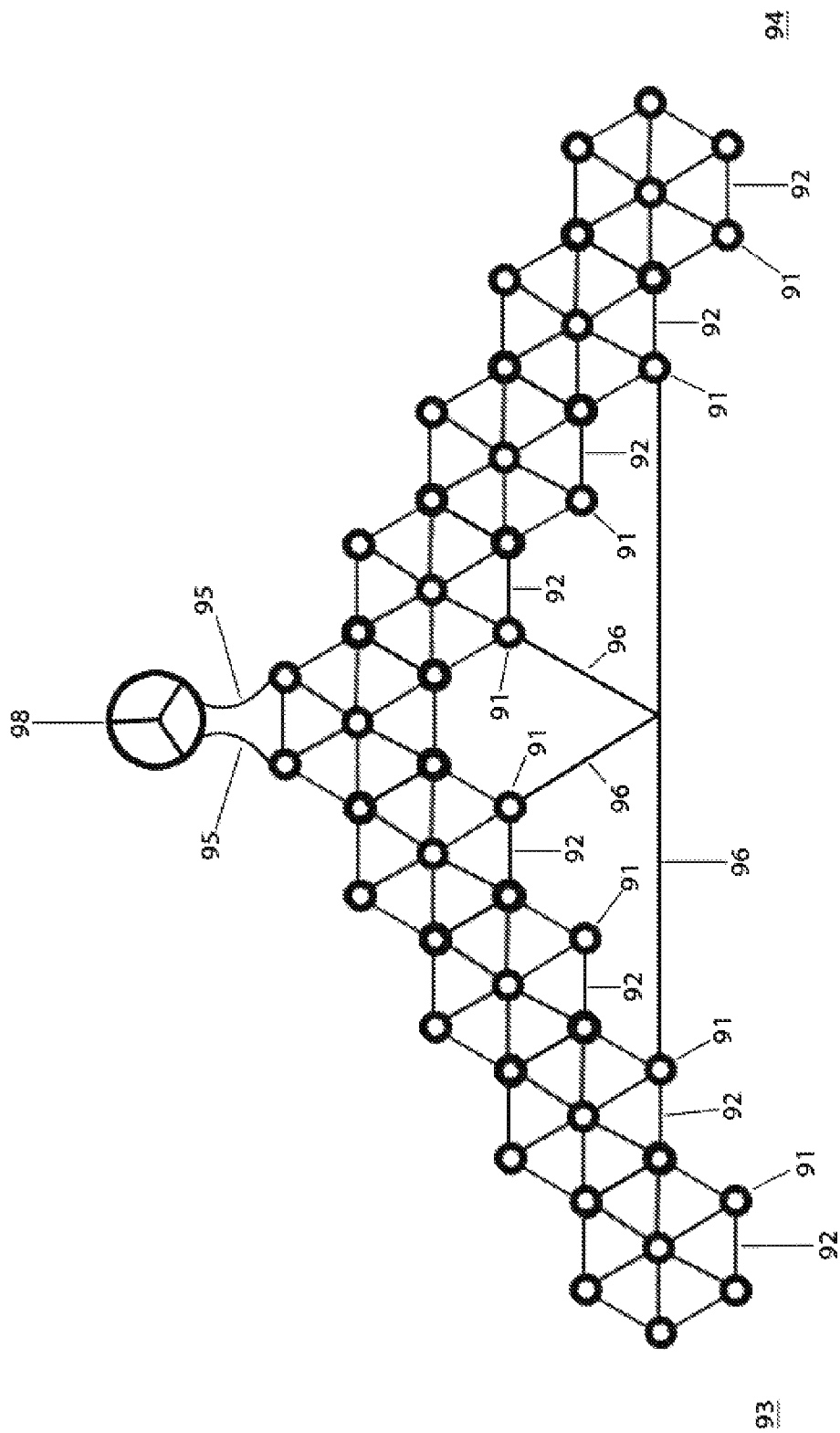
FIG. 9 illustrates a wind/wave energy collection system with an extended grid of wave energy collection devices.

FIG. 9 illustrates a wind/wave energy collection system 90 with an extended grid of wave energy collection devices of the type shown in FIG. 8. A single, primary wind energy capture device 98 may be a mega-watt sized wind turbine or greater suitable for off-shore installation. Structural members 92 hold wave energy capture devices 91 generally at the vertices and centers of hexagons. For simplicity of illustration, structural members 92 are shown as lines while wave energy capture devices 91 are shown as circles. Also for simplicity of illustration, reference numerals are shown for fewer than all of the structural members 92 and wave energy capture devices 91. The hexagonal lattice forms generally a "V" shape with two arms 93, 94 centered on the primary wind energy capture device 98. The lattice connects through two moorings 95 to the wind energy capture device 98. The lattice may have additional moorings along, or at the ends of, arms 93, 94.

Figure 10:
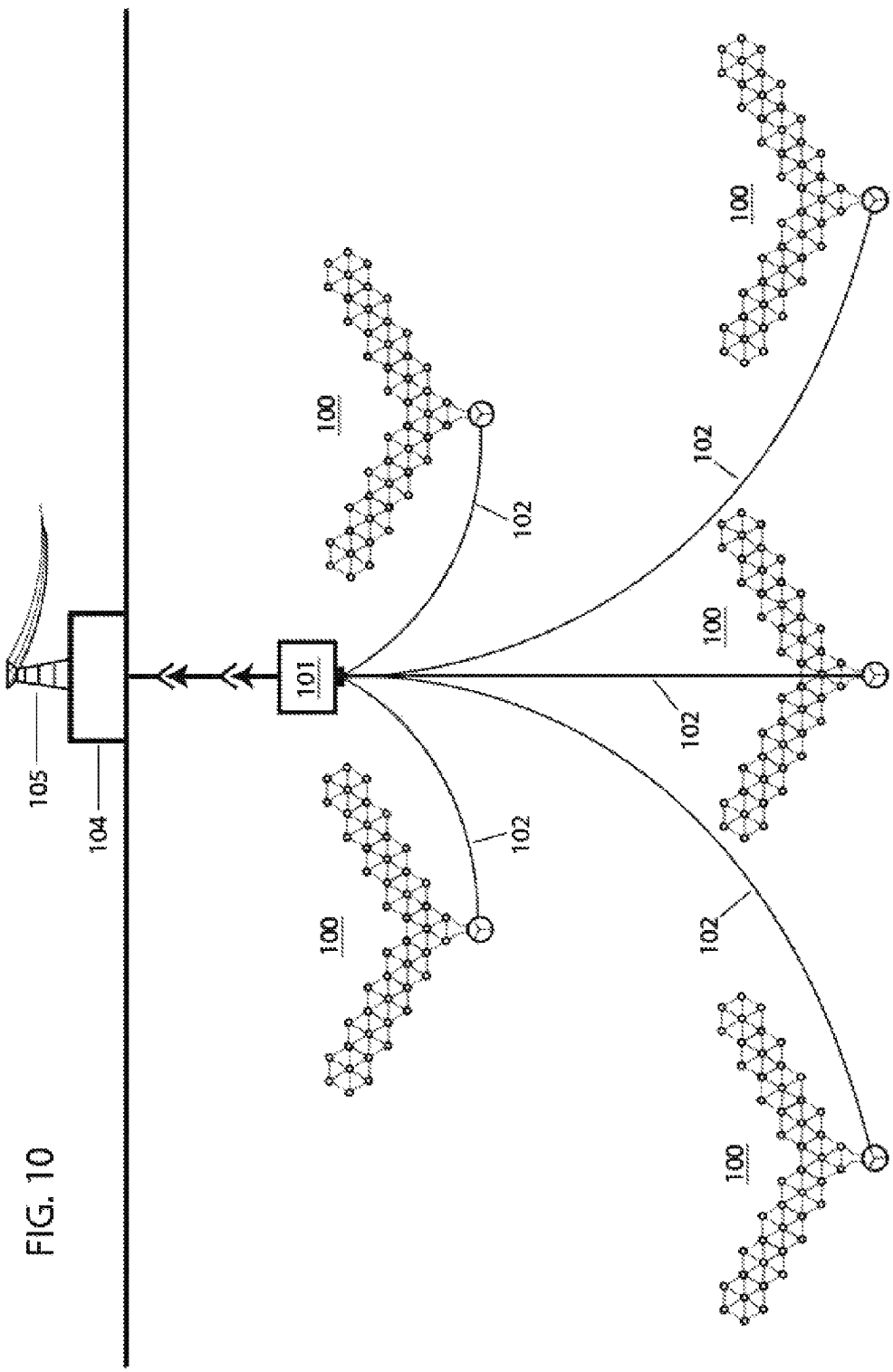
FIG. 10 illustrates a wind/wave energy park made up of five wind/wave energy collection systems FIG. 9.

FIG. 10 illustrates a wind/wave energy park made up of five wind/wave energy collection systems 100 of FIG. 9. Each of the wind/wave energy collection systems 100 is separately anchored at distances that avoid undue interference of either the wind or the wave energy capture devices. By way of non-limiting example, five-megawatt wind turbines might be separated by distances of on the order of 500 meters or more. Each wind/wave energy collection system 100 connects to an offshore electrical substation 101 through one or more electrical transmission cables 102, which may be undersea cables laid on the sea bed or mid water with anchor and buoy arrangements. The offshore substation 101 connects through one or more electrical transmission cables 103 to an on-shore station 104 and, ultimately, to an electricity distribution grid 105. More or fewer wind/wave energy collection systems 100 may be used, and the illustration of five such systems is intended to be illustrative without being limiting.

Figure 11:
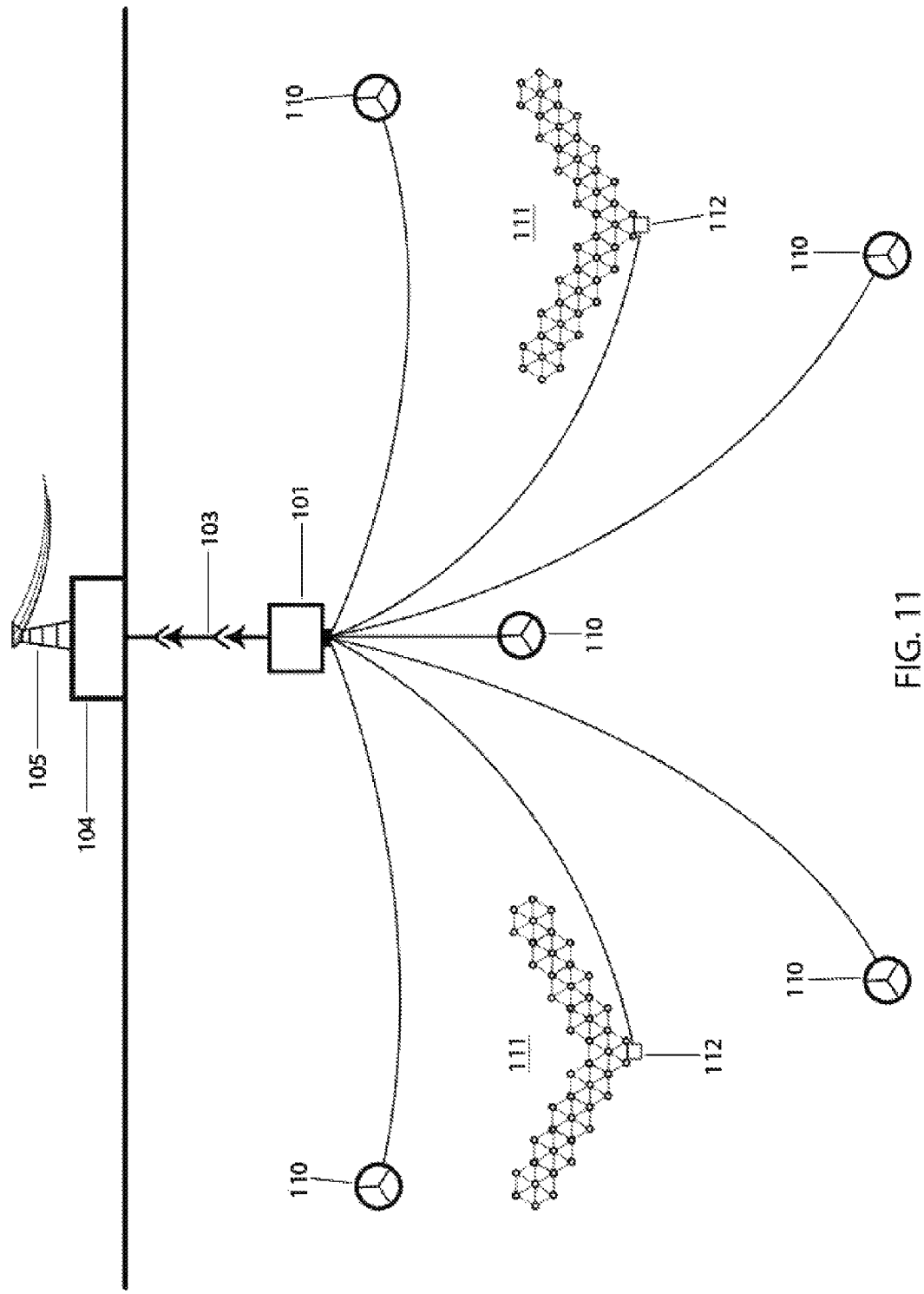
FIG. 11 illustrates an alternative wind/wave energy park made up of five wind energy capture devices and two wave energy capture systems.

FIG. 11 illustrates an alternative wind/wave energy park made up of five wind energy capture devices 110 and two wave energy capture systems 111. Each wind energy capture device 110 may be a wind turbine. Each wave energy capture system 111 may be a grid of wave energy capture devices of the type shown in FIG. 9 (without wind energy capture device 98) but with an anchorage 112 that is not shared with a wind energy capture device 110. In the embodiment of FIG. 11, each wind energy capture device 110 and each wave energy capture system 111 connects through an offshore station 101 and electrical transmission cable 103 to an on-shore station 104 and, ultimately, to an on-shore electric distribution grid 105. The general locations and numbers of wind energy capture devices 110 and wave energy capture devices 110 may vary with site and application.

Figure 12:
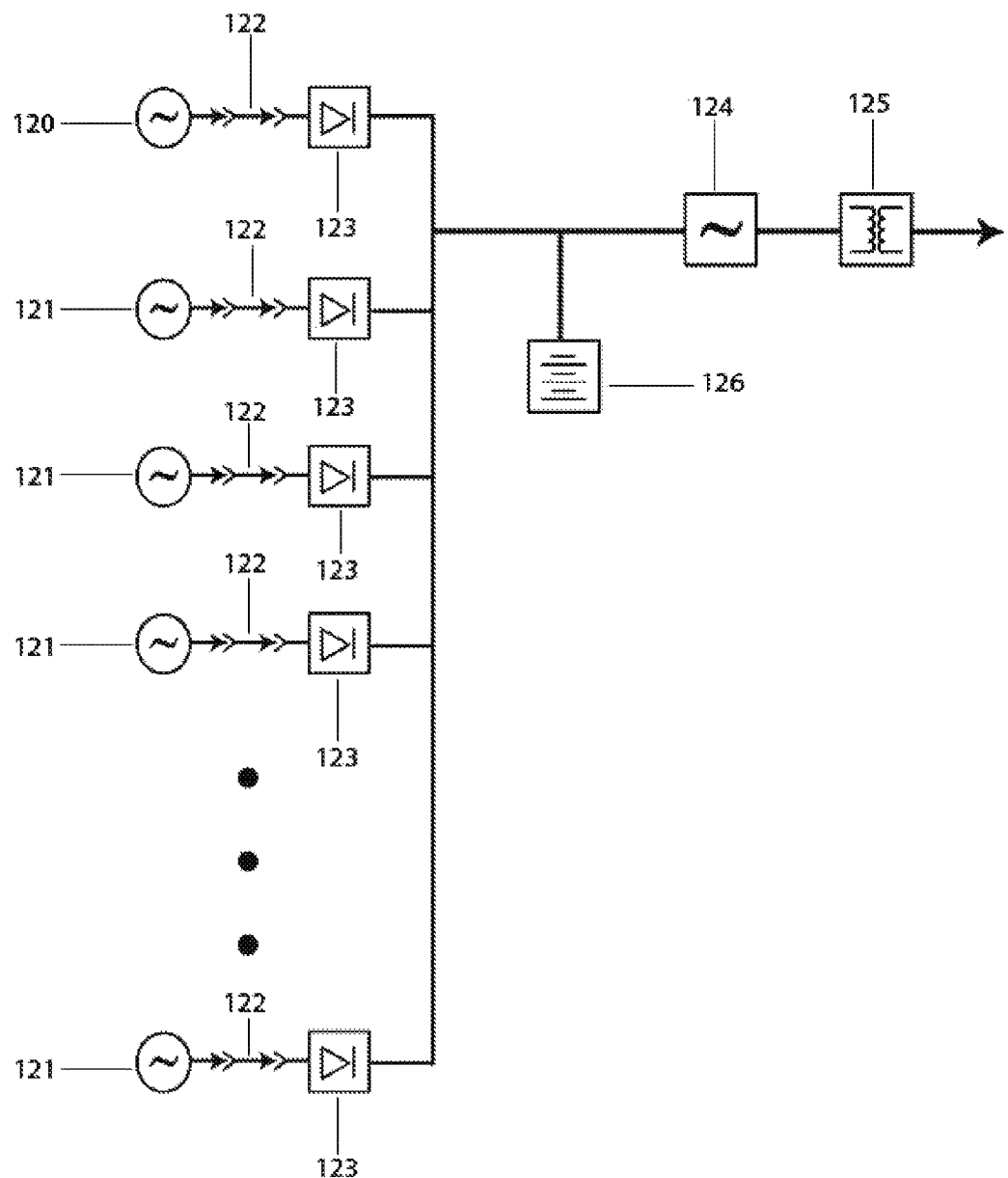
FIG. 12 is a schematic diagram of electrical interconnection of power circuits for a wind/wave energy capture system of the type shown in FIGS. 9 and 10.

FIG. 12 is a schematic diagram of electrical interconnection of power circuits for a wind/wave energy capture system of the type shown in FIG. 9. The wind energy capture device preferably has an alternating current (AC) electric generator 120, and each of the wave energy capture devices preferably has an alternating current (AC) electric generator 121. For simplicity of illustration, generators 121 are shown for only four of the wave energy capture devices, with an understanding that comparable electrical connections would be provided for all generators. Electric transmission cables 122 preferably carry AC electricity from individual wave energy collection devices to a common location, which may be attached to or within the mast of the wind energy capture device 98, or it may be on a separate buoyant platform. There, rectifiers 123 convert AC electricity to direct current (DC) electricity, and DC electricity from all the wave energy capture devices is combined. Preferably, AC current from the generator of the wind energy capture device also is converted to DC. Integrated DC current from all wave energy capture devices (and preferably DC current from the wind energy capture device) feeds an inverter 124, which converts the DC electricity to AC electricity. Other electrical transmission and conversions configurations may also be used. If the AC electricity needs to be transmitted over long distances, a transformer 125 may be provided to step up the AC voltage.

Some form of energy storage 126 may be provided in the DC circuit to smooth short term power variations inherent in wind and wave energy resources. One source of short-term variation is the intra-cycle variations of wave energy capture devices. A single wave energy capture device generates the most electricity during the fast moving parts of the rising and falling stroke. At the top and bottom of a stroke, the generator output is reduced. Wave energy devices are not synchronized, because they are separated in distance and encounter waves at different time. When some wave energy capture devices have a low level of electricity generation, others may have a high level. When combined in the DC part of the circuit, intra-cycle variations will tend to average out, and the total variation at the integrated DC circuit will be less than the sum of the individual variations at the generator outputs. Therefore, the amount of storage required at the DC circuit will be reduced relative to the amount needed to provide an equal level of smoothing at each generator. Energy storage 176 may be by battery or capacitor and other forms may prove useful and desirable in the future.

The inverter 124 can be controlled to cut in (i.e., connect to deliver power to the distribution grid) when the combined outputs of wave energy converters reaches a minimum level of combined power and/or when a minimum level of energy has been accumulated in energy storage 126. The wind energy capture device may be allowed to cut-in independently.

Figure 16:
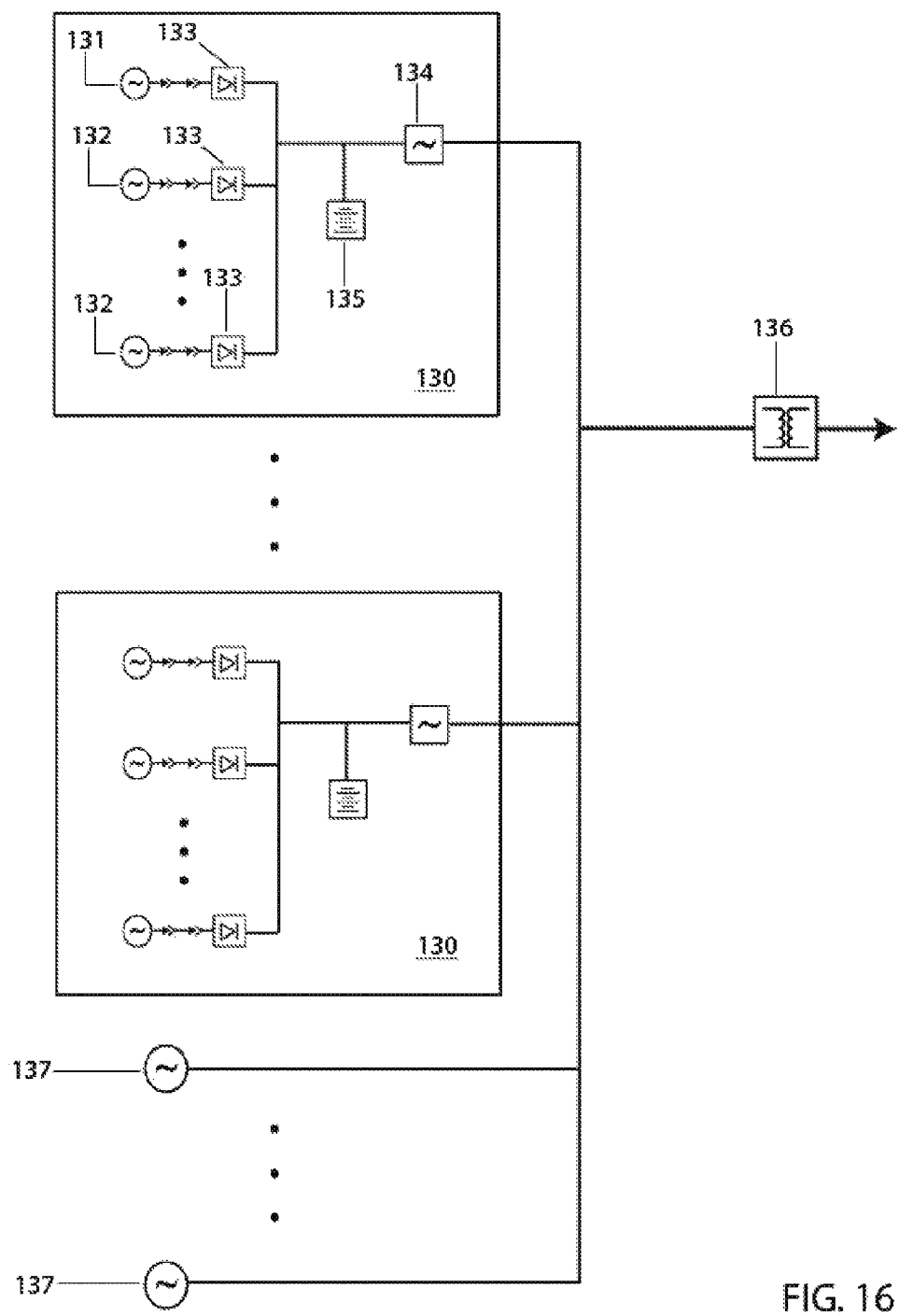
FIG. 16 is a schematic diagram of electrical interconnection of power circuits for a wind/wave energy capture system of the types shown in FIG. 10.

FIG. 16 is a schematic diagram of electrical interconnection of power circuits for a wind/wave energy capture system of the types shown in FIG. 10. Each wind/wave energy capture system (e.g., FIG. 10, item 100) has a local power network 160 drawing electricity from a plurality of electric generators, including a generator 161 for at least one wind energy capture device and a plurality of generators 162 for wave energy capture devices. AC electricity from each generator is transmitted via electrical cable to a common location within the local system, such as at the mooring or a mast of a primary wind energy capture device. There, rectifiers 163 convert AC electricity from each generator 161, 162 to direct current (DC), and DC electricity from all generators 161, 162 is combined. An inverter 164 converts the combined DC power into alternating current (AC). A storage capacity 165 may be provided to smooth variations in the power captured by the wave energy devices. AC power from the inverter 164 is transmitted to a local, off-shore station (e.g., FIG. 10, item 101), where it is combined with AC power from other wind/wave energy capture systems 160 of the wind/wave energy park. Inverters 164 from all wind/wave energy capture systems 160 may be synchronized. A transformer steps up the AC voltage to a level appropriate for transmission to shore.

FIG. 16 further illustrates connectivity for generators 167 for wind energy collection devices that might be anchored separately from wave energy collection devices, such as those illustrated in FIG. 16. Those wind turbines may be operated synchronously with the inverters 164 of the local wind/wave energy collection systems 160. Additional power conditioning may be provided.

By way of non-limiting example, voltages of AC electricity transmitted locally within a wind/wave energy capture system may be on the order of hundreds of volts. Voltages of electricity transmitted from wind/wave energy capture systems to a local, off-shore station may be on the order of thousands of volts. Voltages of electricity transmitted from the substation to shore may be on the order of a hundred thousand volts.

The embodiments described above are intended to be illustrative but not limiting. Various modifications may be made without departing from the scope of the invention. The breadth and scope of the invention should not be limited by the description above, but should be defined only in accordance with the following claims and their equivalents.

What is claim is:

1. A system for maintaining buoyant first and second energy-capture devices in general relative position in water in the presence of surface waves, said system comprising:
   the first and second energy-capture devices, each device including:
      an at least partially submerged floating mast;
      a mass distribution configured to bias the mast into a substantially vertical alignment when in water;
      a floating buoy above the mast;
      a support structure configured to allow the floating buoy to move up and down in parallel with the mast in response to wave motion from surface waves;
      a generator configured to generate electricity as the buoy moves up and down with the wave motion;
   a positioning member connecting the first and second energy-capture devices to form an array, the positioning member comprising:
   (A) a first hinge connection to the buoy of the first energy-capture device;
   (B) a second hinge connection to the buoy of the second energy-capture device; and
   (C) a connecting body between the first and second hinge connections that includes a piston and/or spring that resists compression while permitting limited relative surface displacement between the first and second energy-capture devices.

2. A system as in claim 1 wherein under compression the positioning member develops a restoring force returning the first and second energy-capture devices to nominal positions.

3. A system as in claim 1 further including an anchorage permitting the system to rotate about an anchorage point.

4. The system of claim 1, wherein at least one of the first and second energy capture devices has a wind turbine mounted above the floating buoy.

5. The system of claim 1, wherein the support structure is a cage through which the water can pass, and the floating buoy is larger than the cage.

6. An energy generating system, comprising:
   a plurality of energy-capture devices dispersed in a hexagonal formation with a center, each energy-capturing device including:
      an at least partially submerged floating mast;
      a mass distribution configured to bias the mast into a substantially vertical alignment;
      a floating buoy;
      a support structure connected to and extending above the mast and configured to allow the floating buoy to move up and down in parallel with the mast in response to wave motion;
      a generator configured to generate electricity as the buoy moves up and down with the wave motion;
   a plurality of positioning members, each connecting a pair of the plurality of energy-capture devices, each positioning member comprising:
   (A) a first hinge connection to a buoy of a first one of the pair of energy-capture devices;
   (B) a second hinge connection to a buoy of a second one of the pair of energy-capture device; and
   (C) a connecting body between the first and second hinge connections that includes a piston and/or spring that resists compression while permitting limited relative surface displacement between the first and second energy-capture devices.

7. The system of claim 6, wherein at least one of the plurality of energy capture devices has a wind turbine mounted above the floating buoy.

8. The system of claim 6, wherein the support structure is a cage through which the water can pass, and the floating buoy is larger than the cage.

* * * * *